Patented Nov. 2, 1937

2,097,432

UNITED STATES PATENT OFFICE 2,097,432

ACETATE ARTIFICIAL SILK DYESTUFFS

Peter George Carter and Reginald Harold Sennett, Blackley, Manchester, England, and Cecil Shaw, Grangemouth, Scotland, assignors to Imperial Chemical Industries Limited, a corporation of Great Britain No Drawing. Application November 5, 1935, Serial No. 48,442. In Great Britain November 12, 1934

2 Claims. (Cl. 8—5)

The present invention relates to the use of Bz-1-methoxy-benzanthrone for colouring acetate artificial silk.

We have found that this compound gives brilliant yellow shades of good all-around fastness when dyed or printed on acetate artificial silk. It possesses extremely good affinity for the material, is capable of producing deep shades, and is non-phototropic.

The following examples illustrate, but do not limit, the invention, the parts being by weight.

Example 1

4 parts of Bz-1-methoxybenzanthrone (8% aqueous paste) are intimately mixed with 10 parts of Turkey red oil and 50 parts of cold water and added to 3000 parts of cold water. 100 parts of acetate artificial silk yarn are scoured in a warm, very dilute solution of soap and ammonia, washed in cold water and entered into the cold dyebath. The dyebath is slowly heated to 80° C., and then kept at 80° C., for ¾ hour, the material being turned in the dye liquor continuously. The material is then lifted, washed in cold water and dried. A bright greenish-yellow shade is obtained.

It is dyed a bright greenish-yellow shade which possesses very good fastness to light, washing, acids, alkalis, burnt gas fumes, hot pressing and marking-off.

Example 2

4 parts of Bz-1-methoxybenzanthrone (8% aqueous paste) and 1 part Durenol blue GS paste are intimately mixed with 10 parts of Turkey red oil and 50 parts of cold water, and added to 3000 parts of cold water. 100 parts of acetate artificial silk material (previously scoured as in Example 1) are entered into the cold dyebath and dyed as in Example 1.

The material is dyed a pure bright green of very good fastness to light, washing, acids, alkalis, hot pressing and marking off.

Example 3

10 parts of Bz-1-methoxybenzanthrone (8% paste) are stirred with 25 parts of water and the suspension mixed with 60 parts of gum Senegal thickening (1:1) and 5 parts of glycerine.

The material is printed with the above paste, dried, steamed at 100° C. for ½ hr. and then washed in water to remove the thickening. A bright greenish-yellow shade results.

Having now particularly described and ascertained the nature of our said invention, and in what manner the same is to be performed, we declare that what we claim is:

1. The process for coloring materials comprising cellulose acetate which comprises applying thereto an aqueous dispersion of Bz-1-methoxybenzanthrone.

2. Cellulose ester material colored with Bz-1-methoxybenzanthrone.

PETER GEORGE CARTER.
REGINALD HAROLD SENNETT.
CECIL SHAW.